US012131738B2

(12) United States Patent
Roh et al.

(10) Patent No.: US 12,131,738 B2
(45) Date of Patent: Oct. 29, 2024

(54) ELECTRONIC APPARATUS AND METHOD FOR CONTROLLING THEREOF

(71) Applicant: SAMSUNG ELECTRONICS CO., LTD., Suwon-si (KR)

(72) Inventors: Jaeyoung Roh, Suwon-si (KR); Hejung Yang, Suwon-si (KR); Hojun Jin, Suwon-si (KR); Donghan Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 273 days.

(21) Appl. No.: 17/944,401

(22) Filed: Sep. 14, 2022

(65) Prior Publication Data

US 2023/0017927 A1 Jan. 19, 2023

Related U.S. Application Data

(63) Continuation of application No. PCT/KR2021/012883, filed on Sep. 17, 2021.

(30) Foreign Application Priority Data

Jan. 5, 2021 (KR) .......................... 10-2021-0000983

(51) Int. Cl.
*G10L 15/22* (2006.01)
*G10L 15/02* (2006.01)
*G10L 15/26* (2006.01)

(52) U.S. Cl.
CPC .............. *G10L 15/22* (2013.01); *G10L 15/02* (2013.01); *G10L 15/26* (2013.01); *G10L 2015/223* (2013.01)

(58) Field of Classification Search
CPC ......... G10L 15/22; G10L 15/02; G10L 15/26; G10L 2015/223
(Continued)

(56) References Cited

U.S. PATENT DOCUMENTS 8,234,120 B2 7/2012 Agapi et al.
9,953,632 B2 4/2018 Yun et al.
(Continued)

FOREIGN PATENT DOCUMENTS

JP 2019-139211 A 8/2019
KR 10-2019-0031792 A 3/2019
(Continued)

OTHER PUBLICATIONS

Communication issued on Mar. 13, 2024 by the European Patent Office for European Patent Application No. 21917850.6.
(Continued)

*Primary Examiner* — George C Monikang
(74) *Attorney, Agent, or Firm* — Sughrue Mion, PLLC

(57) ABSTRACT

An electronic apparatus is disclosed. The electronic apparatus may include a microphone; a communication interface; a memory configured to store at least one instruction; and a processor configured to execute the at least one instruction to: obtain a user voice input for registering a wake-up voice input via the microphone; input the user voice input into a trained neural network model to obtain a first feature vector corresponding to text included in the user voice input; receive a verification data set determined based on information related to the text included in the user voice input from an external server via the communication interface; input a verification voice input included in the verification data set into the trained neural network model to obtain a second feature vector corresponding to the verification voice input; and identify whether to register the user voice input as the wake-up voice input based on a similarity between the first feature vector and the second feature vector.

15 Claims, 13 Drawing Sheets

(58) Field of Classification Search
USPC .................................. 704/231, 246, 251
See application file for complete search history.

(56) References Cited

U.S. PATENT DOCUMENTS

| | | | |
|---|---|---|---|
| 10,186,264 B2 | 1/2019 | Sharifi | |
| 10,418,027 B2 | 9/2019 | Ko et al. | |
| 10,714,096 B2 | 7/2020 | Rubin et al. | |
| 10,916,249 B2 | 2/2021 | Han et al. | |
| 11,557,292 B1 * | 1/2023 | Wang | G10L 15/16 |
| 2009/0125299 A1 | 5/2009 | Wang | |
| 2018/0096678 A1 | 4/2018 | Zhou et al. | |
| 2019/0027138 A1 | 1/2019 | Wang et al. | |
| 2019/0066678 A1 | 2/2019 | Tsukamoto | |
| 2019/0251963 A1 | 8/2019 | Li et al. | |
| 2020/0234717 A1 | 7/2020 | Zhao | |
| 2021/0210086 A1 | 7/2021 | Han et al. | |
| 2021/0335360 A1 | 10/2021 | Chung et al. | |

FOREIGN PATENT DOCUMENTS

| | | |
|---|---|---|
| KR | 10-2019-0062369 A | 6/2019 |
| KR | 10-2019-0074012 A | 6/2019 |
| KR | 10-2019-0093962 A | 8/2019 |
| KR | 10-2067973 B1 | 2/2020 |
| KR | 10-2020-0023088 A | 3/2020 |

OTHER PUBLICATIONS

International Search Report dated Dec. 21, 2021 issued by the International Searching Authority in counterpart International Application No. PCT/KR2021/012883 (PCT/ISA/210).
International Written Opinion dated Dec. 21, 2021 issued by the International Searching Authority in counterpart International Application No. PCT/KR2021/012883 (PCT/ISA/237).

* cited by examiner

ELECTRONIC APPARATUS AND METHOD FOR CONTROLLING THEREOF

CROSS-REFERENCE TO RELATED APPLICATION(S)

This application is a bypass continuation of International Application No. PCT/KR2021/012883, filed on Sep. 17, 2021, which is based on and claims priority to Korean Patent Application No. 10-2021-0000983, filed on Jan. 5, 2021, in the Korean Intellectual Property Office, the disclosures of which are incorporated by reference herein in their entireties.

BACKGROUND

1. Field

The disclosure relates to an electronic apparatus and a method for controlling the electronic apparatus. More particularly, the disclosure relates to an electronic apparatus configured to register a user voice input for waking up the electronic apparatus and a control method thereof.

2. Description of Related Art

Recently, a technology for controlling an electronic apparatus through a user voice input has been developed. Particularly, the electronic apparatus may receive a wake-up voice input to activate the electronic apparatus or may activate a specific application (e.g., artificial intelligence application) of the electronic apparatus.

In order to register a conventional wake-up voice input, or in order to clearly recognize a text included in a user voice input to be registered as a wake-up voice input, the electronic apparatus 100 was able to register the wake-up voice input only through a procedure of uttering the same word a plurality of times (e.g., 5 or more times). In this case, since the user often feels awkward or uncomfortable while uttering the same word a plurality of times, there was a limitation in usability. If the wake-up voice input is registered by uttering the user voice input to be registered as the wake-up voice input only once, there may be a problem in that the electronic apparatus 100 is activated through the user voice input including a registered text and similar text.

In addition, when the user voice input that the user wants to register as a wake-up voice input is not appropriate as the wake-up voice input, there may be a need to inform the user of this.

SUMMARY

The disclosure provides an electronic apparatus capable of registering a high-quality wake-up voice input while minimizing the number of utterances of a user for registering a wake-up voice input, and a method for controlling thereof.

According to an aspect of an example embodiment, an electronic apparatus may include a microphone; a communication interface; a memory configured to store at least one instruction; and a processor configured to execute the at least one instruction to: obtain a user voice input for registering a wake-up voice input via the microphone; input the user voice input into a trained neural network model to obtain a first feature vector corresponding to text included in the user voice input; receive a verification data set determined based on information related to the text included in the user voice input from an external server via the communication interface; input a verification voice input included in the verification data set into the trained neural network model to obtain a second feature vector corresponding to the verification voice input; and identify whether to register the user voice input as the wake-up voice input based on a similarity between the first feature vector and the second feature vector.

The processor may recognize the user voice input to obtain the information related to the text included in the user voice input; and transmit the information related to the text included in the user voice input to the external server via the communication interface. The external server may obtain, using the information related to the text, the verification voice input based on a first phoneme sequence of a verification voice text that includes a number of common phonemes with a second phoneme sequence of the text included in the user voice input.

The verification voice input is voice data corresponding to the verification voice text having the number of common phonemes that is equal to or greater than a threshold value.

The processor may, based on the similarity between the first feature vector and the second feature vector being less than the threshold value, input another verification voice input included in the verification data set into the trained neural network model to obtain a third feature vector corresponding to the another verification voice input; compare another similarity between the first feature vector and the third feature vector; and based on the other similarity between the first feature vector and the third feature vector being equal to or greater than the threshold value, provide a guide message requesting an additional user voice input for registering a wake-up voice input.

The processor may, based on a plurality of similarities between feature vectors corresponding to all verification voice inputs included in the verification data set and the first feature vector being less than the threshold value, register the user voice input as the wake-up voice input.

The processor may input the user voice input into a voice recognition model to obtain the text included in the user voice; and based on at least one of a length and a duplication of phonemes of the text included in the user voice input, identify whether to register the text included in the user voice input as the text of the wake-up voice input.

The processor may, based on a number of phonemes of the text included in the user voice input being less than a first threshold value or the number of phonemes of the text included in the user voice input being duplicated by greater than a second threshold value, provide a guide message requesting an utterance of an additional user voice input including another text for registering a wake-up word.

The guide message is configured to include a message for recommending the another text determined based on usage history information of the electronic apparatus as the text of the wake-up voice input.

The processor may input the user voice input into a trained voice identification model to obtain a feature value indicating whether the user voice input is a user voice input uttering a specific text; and identify whether to register the user voice input as the wake-up voice input based on the feature value.

The processor may, based on the feature value being less than the threshold value, provide the guide message requesting the additional user voice input for registering the wake-up voice input.

According to an aspect of an example embodiment, a method of controlling an electronic apparatus may include obtaining a user voice input for registering a wake-up voice input; inputting the user voice input into a trained neural network model to obtain a first feature vector corresponding to text included in the user voice input; receiving a verification data set determined based on information related to the text included in the user voice input from an external server; inputting a verification voice input included in the verification data set into the trained neural network model to obtain a second feature vector corresponding to the verification voice input; and identifying whether to register the user voice input as the wake-up voice input based on a similarity between the first feature vector and the second feature vector.

The method may include recognizing the user voice input to obtain the information related to the text included in the user voice input; and transmitting the information related to the text included in the user voice input to the external server. The server may obtain the verification voice based on a first phoneme sequence of a verification voice text that includes a number of common phonemes with a second phoneme sequence of the text included in the user voice input.

The verification voice input may be voice data corresponding to the verification voice text having the number of common phonemes that is equal to or greater than a threshold value.

The method may include, based on the similarity between the first feature vector and the second feature vector being less than the threshold value, inputting another verification voice input included in the verification data set into the trained neural network model to obtain a third feature vector corresponding to the another verification voice input; comparing another similarity between the first feature vector and the third feature vector; and based on the other similarity between the first feature vector and the third feature vector being equal to or greater than the threshold value, providing a guide message requesting an additional user voice input for registering a wake-up voice input.

The method may include, based on a plurality of similarities between feature vectors corresponding to all verification voice inputs included in the verification data set and the first feature vector being less than the threshold value, registering the user voice input as the wake-up voice input.

According to the embodiment of the disclosure as described above, a convenience or usability of the wake-up voice input registration procedure may be increased by reducing the number of utterances of the user for registering the wake-up voice to a minimum, and a performance of a technology capable of controlling an electronic apparatus through voice recognition by registering a high-quality of wake-up voice.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
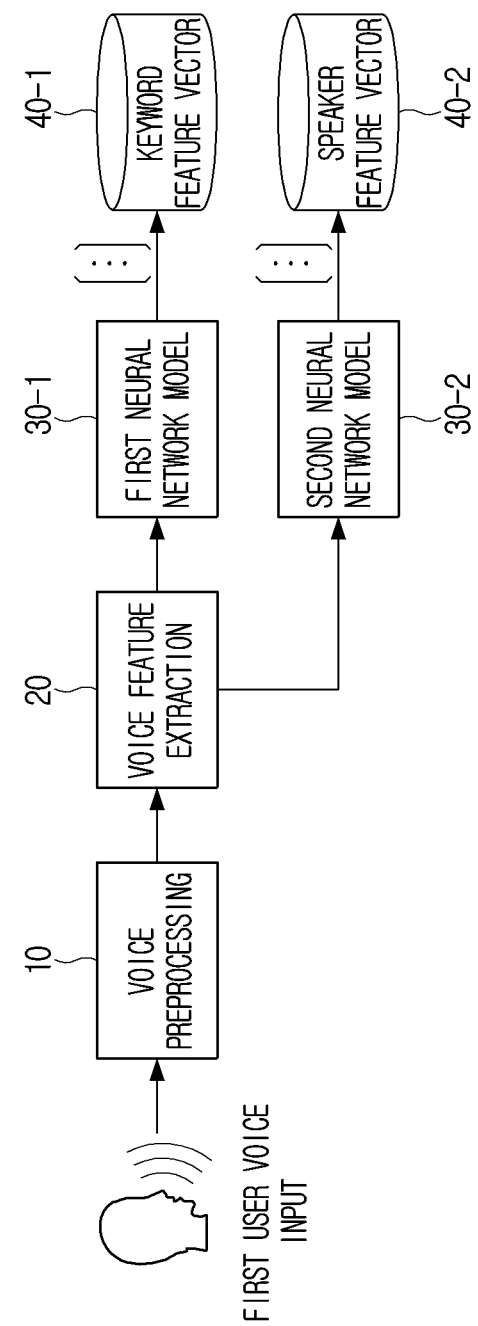
FIG. 1A is a view illustrating a process of registering a wake-up voice input.

The disclosure may have several embodiments, and the embodiments may be modified variously. In the following description, specific embodiments are provided with accompanying drawings and detailed descriptions thereof. However, it should be understood that the disclosure is not limited to the specific embodiments described hereinafter, but includes various modifications, equivalents, and/or alternatives of the embodiments of the disclosure. In relation to explanation of the drawings, similar drawing reference numerals may be used for similar constituent elements.

In describing example embodiments, detailed description of relevant known functions or components may be omitted if it would obscure the description of the subject matter.

In addition, the example embodiments may be changed in various forms, and therefore, the technical scope is not limited to the following example embodiments. Rather, these example embodiments are provided to make the disclosure thorough and complete.

The terms used herein are solely intended to explain a specific example embodiment, and not to limit the scope of the disclosure. Singular forms are intended to include plural forms unless the context clearly indicates otherwise.

The terms "have," "may have," "include," and "may include" used in the embodiments of the disclosure indicate the presence of corresponding features (for example, elements such as numerical values, functions, operations, or parts), and do not preclude the presence of additional features.

In the description, the terms "A or B," "at least one of A and/or B," or "one or more of A and/or B" may include all possible combinations of the items that are enumerated together. For example, the terms "A or B" or "at least one of A and/or B" may designate (1) at least one A, (2) at least one B, or (3) both at least one A and at least one B.

The expressions "1," "2," "first," or "second" as used herein may modify a variety of elements, irrespective of order and/or importance thereof, and only to distinguish one element from another. Accordingly, without limiting the corresponding elements.

When an element (e.g., a first element) is "operatively or communicatively coupled with/to" or "connected to" another element (e.g., a second element), an element may be directly coupled with another element or may be coupled through the other element (e.g., a third element). When an element (e.g., a first element) is "directly coupled with/to" or "directly connected to" another element (e.g., a second element), an element (e.g., a third element) may not be existed between the other element.

When an element (e.g., a first element) is "directly coupled with/to" or "directly connected to" another element (e.g., a second element), an element (e.g., a third element) may not be exist between the element and the other element In the description, the term "configured to" may be changed to, for example, "suitable for," "having the capacity to," "designed to," "adapted to," "made to," or "capable of" under certain circumstances. The term "configured to (set to)" does not necessarily mean "specifically designed to" in a hardware level.

Under certain circumstances, the term "device configured to" may refer to "device capable of" doing something together with another device or components. For example, the processor configured to perform "A, B, and C" may be realized as a dedicated processor for performing functions (for example, embedded processor) or a generic-purpose processor for performing functions by running one or more software programs stored in a memory device (for example, a central processing unit (CPU) or an application processor (AP)), In the embodiments disclosed herein, the terms "module" or "unit" refer to an element that performs at least one function or operation. The "module" or "unit" may be realized as hardware, software, or combinations thereof. In addition, a plurality of "modules" or "units" may be integrated into at least one module and may be realized as at least one processor in an integrated manner except for "modules" or "units" that should be realized in specific hardware.

Further, various elements and areas in the drawings are schematically drawn. Therefore, the technical ideas are not limited by a relative size or interval drawn in the accompanying drawings.

According to various embodiments of the disclosure may include, for example, at least one of a smart phone, a tablet personal computer (PC), a desktop PC, a laptop PC, and a wearable device. Wearable devices may include at least one of accessories (e.g., watches, rings, bracelets, anklets, necklaces, glasses, contact lenses, or head-mounted-devices (HMDs)), fabrics or clothing (e.g., electronic clothing), a body attachment type (e.g., a skin pad or a tattoo), or a bio-implantable circuit.

According to another embodiment, the electronic apparatus may be a home appliance. Home appliances include, for example, at least one of televisions, digital video disk (DVD) players, audio, refrigerators, air conditioners, vacuum cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™' PlayStation™, etc.), electronic dictionaries, electronic keys, camcorders, or electronic frames.

According to an embodiment of the disclosure, the wake-up voice input may be a user voice input that causes the electronic apparatus 100 to perform a wake-up operation. In this case, the wake-up operation may mean an operation for activating the electronic apparatus 100, activating a specific application, or activating a specific function of the electronic apparatus 100. Also, activation may mean a state that power, application, or function of the electronic apparatus 100 is turned off or switched from a standby mode to an on state. Also, the wake-up voice input according to an embodiment of the disclosure may be used as another term such as a trigger voice input, or the like.

The example embodiments of the disclosure will be described in greater detail below in a manner that will be understood by one of ordinary skill in the art FIG. 1A is a view illustrating a process of registering a wake-up voice input.

When entering a wake-up voice input registration mode, the electronic apparatus 100 may receive a first user voice input to be registered as a wake-up voice input via a microphone. In this case, the first user voice input may include a specific text as a keyword of the wake-up voice input to be registered.

The electronic apparatus 100 may perform pre-processing on the received first user voice input in operation 10. Specifically, the electronic apparatus 100 may perform a preprocessing operation such as noise removal and sound quality enhancement.

The electronic apparatus 100 may extract a voice feature of the preprocessed first user voice input in operation 20. Specifically, the electronic apparatus 100 may extract a voice feature by converting the preprocessed first user voice input from a time dimension to a frequency dimension.

The electronic apparatus 100 may input the user voice input converted into the frequency dimension to each of a first neural network model 30-1 and a second neural network model 30-2. In this case, the first neural network model (e.g., keyword recognition model, voice recognition model, etc.) may be a neural network model trained to obtain a feature vector corresponding to text included in the user voice input, and a second neural network model (e.g., speaker recognition model) may be a neural network model trained to obtain a feature vector corresponding to a unique feature (e.g., a glottis) of a voice of a speaker who uttered the user voice input.

In addition, the electronic apparatus 100 may register a feature vector corresponding to a text included in the first user voice input that is output to the first neural network model 30-1 as a keyword feature vector 40-1, and a feature vector corresponding to the voice features of the speaker who uttered the first user voice input that is output to the neural network model 30-2 may be registered as a speaker feature vector 40-2 to register the first user voice input as a wake-up voice input.

In particular, the electronic apparatus 100 may guide the user to utter the user voice input including the same text about 5 times, and may register the first user voice input as a wake-up voice input through the same process as in FIG. 1A a plurality of times.

Figure 1B:
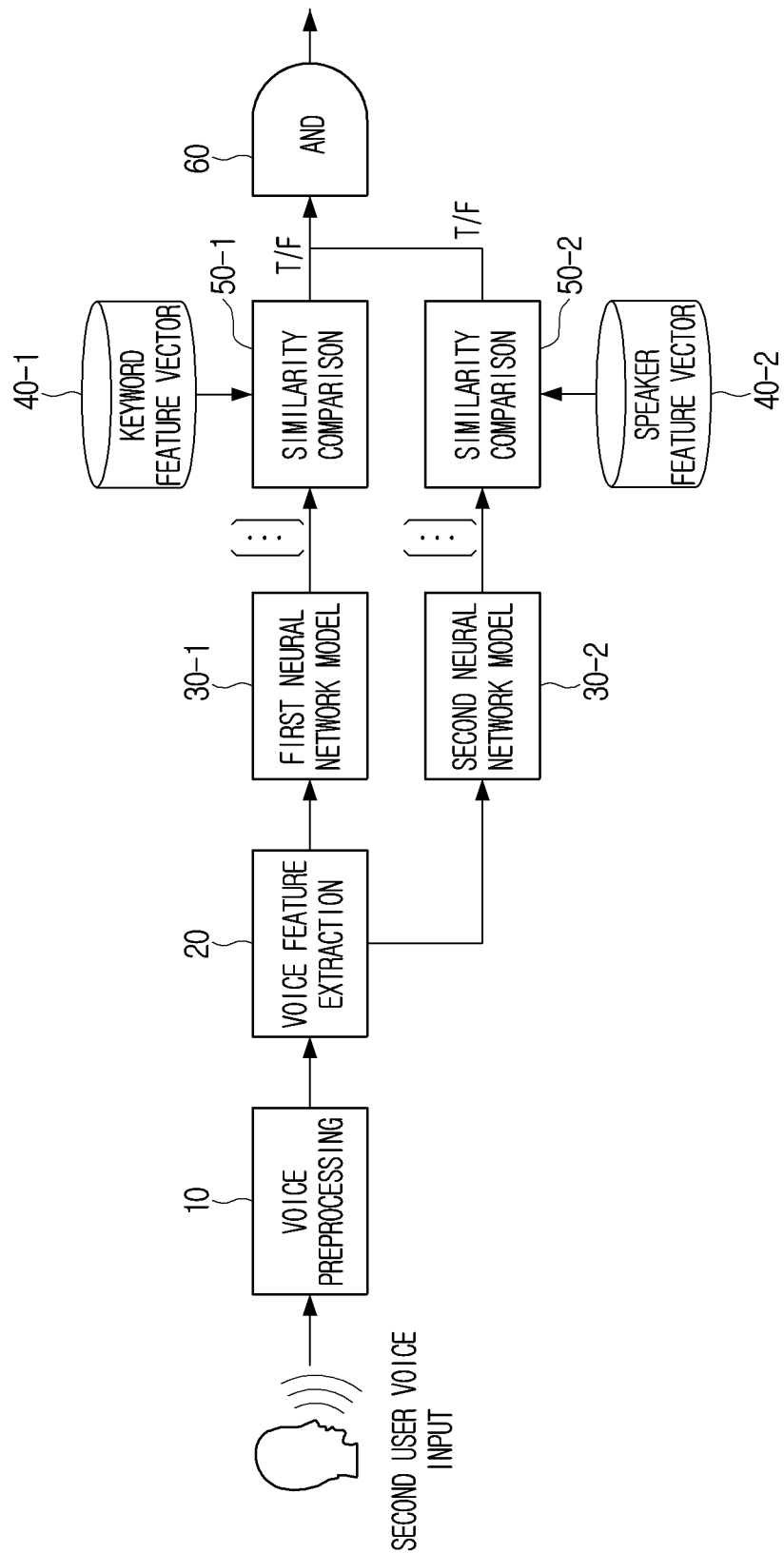
FIG. 1B is a view illustrating a process of waking up an electronic apparatus using a registered wake-up voice input.

FIG. 1B is a view illustrating a process of waking up an electronic apparatus using a registered wake-up voice input.

The electronic apparatus 100 may receive a second user voice input for waking up the electronic apparatus 100 through a microphone.

The electronic apparatus 100 may perform preprocessing on the received second user voice input in operation 10, and may extract voice features of the preprocessed second user voice input in operation 20.

The electronic apparatus 100 may input the user voice input to each of the first neural network model 30-1 and the second neural network model 30-2.

The electronic apparatus 100 may compare a similarity between a feature vector corresponding to the text included in the second user voice input that is output to the first neural network model 30-1 and the pre-registered keyword feature vector 40-1 (in operation 50-1) to identify a similarity between a feature vector corresponding to the voice feature of the speaker who uttered the second user voice input that is output to the second neural network model 30-2 and a previously registered speaker feature vector 40-2 (in operation 50-2). In this case, the similarity of the feature vectors may be identified by a distance between the feature vectors. More particularly, it may be identified that the similarity of the feature vectors is high when the distance between the feature vectors is shorter, and it may be identified that the similarity of the feature vectors is low when the distance between the feature vectors is greater.

When the similarity between the feature vector corresponding to the text included in the second user voice input and the pre-registered keyword feature vector 40-1, and the similarity between the feature vector corresponding to the voice feature of the speaker who uttered the second user voice input and the pre-registered speaker feature 40-2 is equal to or greater than a threshold value (operation 60), the electronic apparatus 100 may wake-up the electronic apparatus 100 based on the second user voice input.

However, when the similarity between the feature vector corresponding to the text included in the second user voice input and the pre-registered keyword feature vector 40-1, and the similarity between the feature vector corresponding to the voice feature of the speaker who uttered the second user voice input and the pre-registered speaker feature 40-2 is less than the threshold value (operation 60), the electronic apparatus 100 may ignore the second user voice input without waking up the electronic apparatus 100 according to the acquired second user voice input.

An embodiment of the disclosure is to register a wake-up voice input for performing an operation for waking up the electronic apparatus 100 as described with reference to FIGS. 1A and 1B. More particularly, the disclosure relates to a method of registering a wake-up voice input of higher quality while minimizing a procedure of registering the wake-up voice input.

Figure 2:
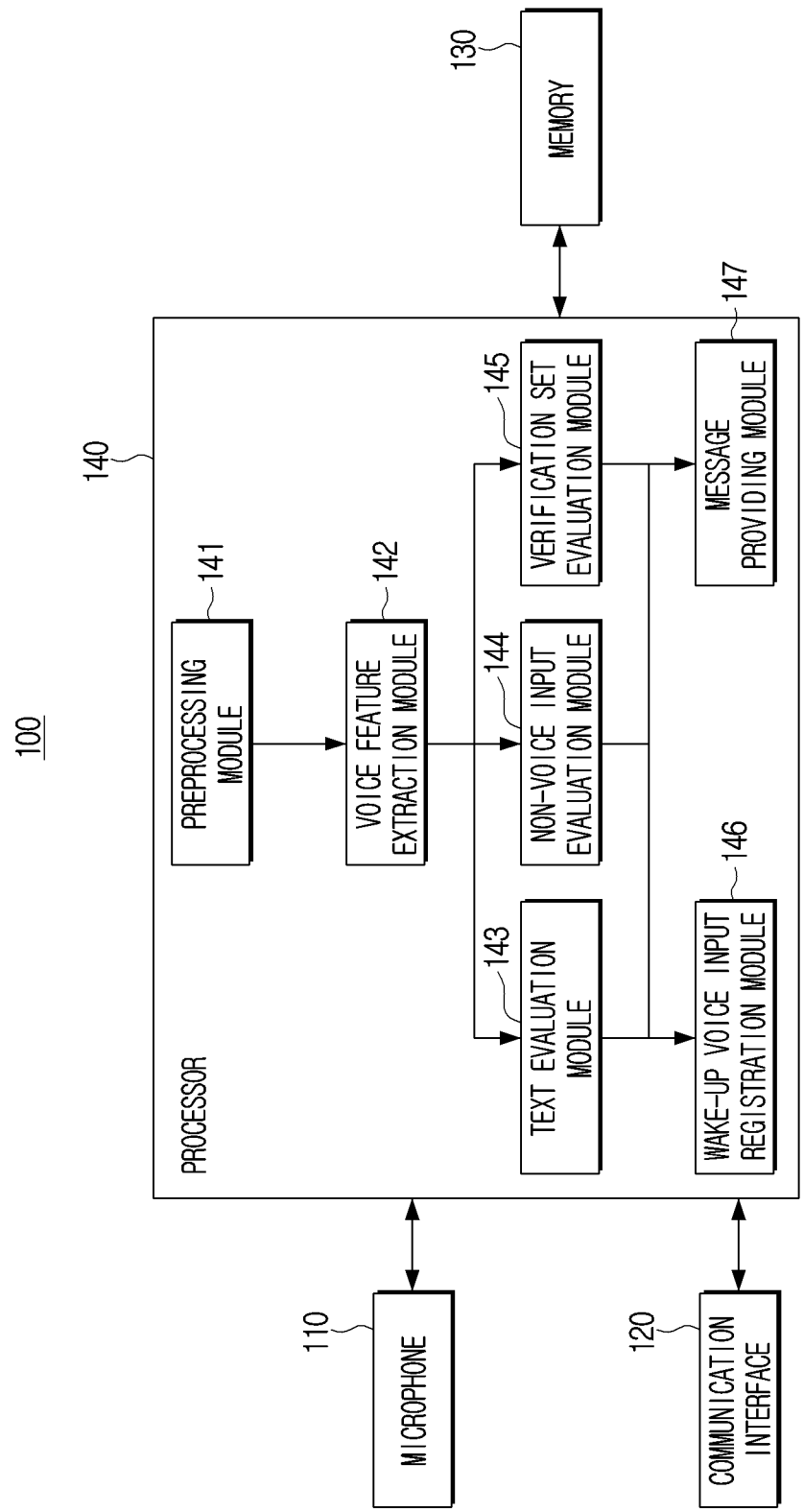
FIG. 2 is a block diagram schematically illustrating a configuration of an electronic apparatus according to an embodiment.

Hereinafter, example embodiments will be described in detail with reference to accompanying drawings. FIG. 2 is a block diagram showing a configuration of a control device according to an exemplary embodiment.

The electronic apparatus 100 may include a microphone 110, a communication interface 120, a memory 130, and a processor 140. Here, the electronic apparatus 100 may be a smartphone. However, the electronic apparatus 100 according to the disclosure is not limited to a specific type of device, and may be implemented as various types of electronic apparatuses 100 such as a tablet PC, a notebook PC, and a digital TV.

The microphone 110 may receive a user voice input uttered by the user. In this case, the microphone 110 may convert the received user voice input into an electrical signal representing a change in voltage over time.

In this case, the microphone 110 may be provided inside the electronic apparatus 100, but this is only an example embodiment, and may be located outside and electrically connected to the apparatus.

The communication interface 120 includes a circuit and may communicate with an external device. Specifically, the processor 140 may receive various data or information from an external device connected through the communication interface 120, and may transmit various data or information to the external device.

The communication interface 120 may include at least one of a wireless fidelity (Wi-Fi) module, a Bluetooth module, a wireless communication module, and a near field communication (NFC) module. In particular, the Wi-Fi module and the Bluetooth module may perform communication using a Wi-Fi method and a Bluetooth method, respectively. If the Wi-Fi module or the Bluetooth module is used, various kinds of connection information such as a service set identifier (SSID), a session key, and the like, is transmitted and received first, and after establishing communication, various kinds of information may be transmitted and received.

The wireless communication chip may perform communication in accordance with various communication standards, such as IEEE, ZigBee, 3rd Generation (3G), 3rd Generation Partnership Project (3GPP), and Long Term Evolution (LTE). The NFC module represents a module which is operated with an NFC method which uses 13.56 MHz band among various radio-frequency identification (RFID) frequency bands such as 135 kHz, 13.56 MHz, 433 MHz, 860-960 MHz, 2.45 GHz, and the like.

In particular, according to various embodiments of the disclosure, the communication interface 120 may transmit information related to a text corresponding to a user voice input to be registered as a wake-up voice input to an external server 200, and may receive a verification data set obtained based on the user voice input to be registered as a wake-up voice input from the external server 200. In this case, the verification data set may include a phoneme sequence included in the user voice input to be recorded as a wake-up voice input and at least one verification voice input having a common phoneme sequence equal to or greater than a threshold value.

The memory 130 may store instructions for controlling the electronic apparatus 100. An instruction means one action statement that can be directly executed by the processor 140 in a program writing language, and is a minimum unit for program execution or action.

Particularly, the memory 130 may store data for a module for registering a wake-up voice input to perform various operations. A module for registering wake-up voice input may include a pre-processing module 141, a voice feature extraction module 142, a text evaluation module 143, a non-voice input evaluation module 144, a verification set evaluation module 145, a wake-up voice input registration module 146, and a message providing module 147. In addition, the memory 130 may store a keyword recognition model trained to recognize a specific keyword included in the user voice input for registering a wake-up voice input, a voice recognition model trained to acquire text corresponding to the user voice input, a speaker recognition model trained to acquire voice characteristics of the speaker who uttered the user voice input, and a voice activity detection model trained to detect a voice section in audio containing the user voice. Also, the memory 130 may store a usage history database (DB) including a record (e.g., a search record, an execution record, a purchase record, etc.) of the user using the electronic apparatus 100.

The memory 130 may include a non-volatile memory capable of maintaining stored information even when power supply is interrupted, and a volatile memory that requires continuous power supply to maintain the stored information. Data for a module for registering the wake-up voice input to perform various operations may be stored in the non-volatile memory. In addition, various neural network models such as a keyword recognition model (or a voice recognition model), a speaker recognition model, and a speech section detection model may also be stored in the non-volatile memory.

The processor 140 may be electrically connected to the memory 130 to control overall functions and operations of the electronic apparatus 100.

When a user command for registering the wake-up voice input is input, the processor 140 may load data for the module for registering the wake-up voice input stored in the non-volatile memory to perform various operations into the volatile memory. In addition, the processor 140 may load a neural network model, such as a keyword recognition model, a speaker recognition model, a voice activity detection model, or the like, into the volatile memory. The processor 140 may perform various operations through various modules and neural network models based on data loaded into the volatile memory. Here, the loading refers to an operation of loading and storing data stored in the non-volatile memory into the volatile memory such that the processor 140 can access it.

When a user command for registering a wake-up voice input is input, the processor 140 may enter a mode for registering the wake-up voice input. Particularly, the processor 140 may provide a user interface (UI) for guiding registration of the wake-up voice input. The UI may include a message guiding an utterance of the user voice input.

The processor 140 may acquire a user voice input to be registered as a wake-up voice input through the microphone 110. The user voice input to be registered as the wake-up voice input may include a keyword, which is text such as a password for waking up the electronic apparatus 100.

When the user voice input is acquired through the microphone 110, the processor 140 may perform a pre-processing operation on the user voice input acquired through the pre-processing module 141. Specifically, the preprocessing module 141 may remove noise included in the acquired user voice input, and may perform an operation such as sound quality enhancement for clarifying the user voice input included in an audio signal.

The processor 140 may extract a voice feature with respect to the user voice input preprocessed through the voice feature extraction module 142. In this case, extracting the voice feature may mean converting the preprocessed user voice input from a time dimension to the frequency dimension. In this case, the voice feature extraction module 142 may transform the user voice input in the time dimension into the frequency dimension by using a Fourier transform, or the like.

The processor 140 may evaluate the text included in the frequency-dimensionally transformed user voice input using the text evaluation module 143 to verify whether the user voice input is registered as a wake-up voice input.

Figure 3:
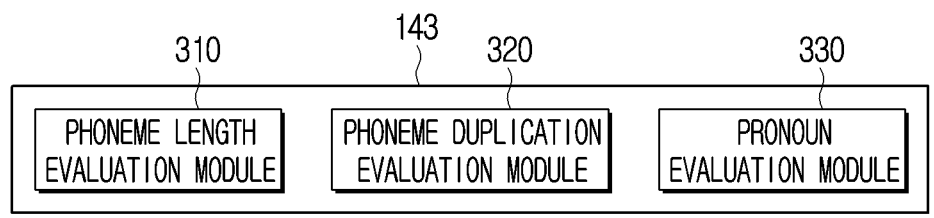
FIG. 3 is a block diagram illustrating a configuration of a text evaluation module according to an embodiment.

As shown in FIG. 3, the text evaluation module 143 may include a phoneme length evaluation module 310, a phoneme duplication evaluation module 320, and a pronoun evaluation module 330.

Specifically, the text evaluation module 143 may acquire information related to the text included in the user voice input by performing voice recognition on the user voice input through a voice recognition model. In this case, the information related to the text may be information related to a phoneme included in the text.

The phoneme length evaluation module 310 may verify whether the user voice input can be registered as a wake-up voice input based on a length of the phoneme included in the text. In this case, the phoneme length evaluation module 310 may verify whether the user voice input can be registered as a wake-up voice input by identifying whether the length of the phoneme included in the text is equal to or less than a threshold value. For example, when the user voice input is "cha," the text evaluation module 143 may obtain "JA" as a phoneme for the user voice input, and the phoneme length evaluation module 310 may identify that the number of phonemes is equal to or less than a threshold value (e.g., 2), and may identify the user voice input is not suitable to be registered as the wake-up voice input.

The phoneme duplication evaluation module 320 may verify whether the user voice input can be registered as a wake-up voice input based on whether phonemes included in the text are duplicated. In this case, the phoneme duplication evaluation module 320 may verify whether the user voice input can be registered as a wake-up voice by identifying whether the number of duplicate phonemes included in the text is equal to or greater than a threshold value. For example, if the user voice input is "yayaya," the text evaluation module 143 may obtain "JA JA JA" as a phoneme for the user voice input, and the phoneme duplication evaluation module 320 may identify that the phoneme is duplicated as a threshold value (e.g., three times) and identify that the user voice input is not suitable for registration as the wake-up voice input.

The pronoun evaluation module 330 may verify whether the user voice input can be registered as a wake-up voice input based on whether the text contains a pronoun. For example, if the user voice is "that," the pronoun evaluation module 330 may identify that the user voice input includes a pronoun and identify that the user voice input is not suitable to be registered as the wake-up voice input.

In the embodiment described above, the text evaluation module 143 may identify that the user voice input is suitable to be registered as a wake-up voice input based on the length of the phoneme, whether it is duplicated, and whether it includes a pronoun, but this is only an embodiment, and the text evaluation module 143 may identify that the user voice input is suitable to be registered as the wake-up voice input based on other features of a text (e.g., when the length of the text is equal to or greater than a threshold value).

Referring back to FIG. 2, the processor 140 may identify whether the user voice input is a user voice input uttering a specific text through the non-voice input evaluation module 144. In other words, the non-voice input evaluation module 144 may identify whether the user voice input acquired through the microphone 110 is not a human voice input or whether the voice input is a voice input that is not intended to utter text such as sneezing, shouting, or the like, to verify whether or not to register the user voice input as the wake-up voice input.

Figure 4:
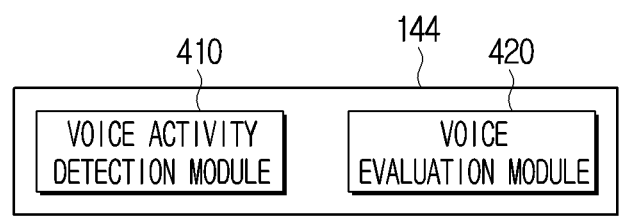
FIG. 4 is a block diagram illustrating a configuration of a non-voice input evaluation module according to an embodiment.

Specifically, as shown in FIG. 4, the non-voice input evaluation module 144 may include a voice activity detection module 410 and a voice evaluation module 420. In this case, the voice activity detection module 410 may identify whether a non-voice input is included in the user voice input through the learned voice activity detection model. Specifically, the voice activity detection model is a neural network model learned using training data for voice inputs and non-voice inputs, and may acquire a feature value indicating whether a voice activity is included in the user voice input. The voice evaluation module 420 may identify that a non-voice input is included in the user voice input based on the feature value obtained through the voice activity detection module 410. Specifically, when the feature value obtained through the voice activity detection module 410 is less than the threshold value, the voice evaluation module 420 may identify that the user voice input includes a non-voice input in addition to the voice activity, and when the feature value obtained through the voice activity detection module 410 is equal to or greater than the threshold value, the voice evaluation module 420 may identify that the non-voice input is not included in the user voice input.

In the embodiment described above, the non-voice evaluation module 144 verifies whether a non-voice input is included in the user voice input using the voice activity detection model, but this is only an embodiment, and the module may verity whether the user voice input contains a non-voice input by using another method. For example, the non-voice input evaluation module 144 may model a feature (e.g., zero crossing rate, spectral entropy, etc.) related to the feature of the voice input, and identify whether a voice activity is detected in the user voice input based on whether the modeled feature appears in the user voice input. In other words, when a non-voice activity other than the voice activity is detected in the user voice, the non-voice input evaluation module 144 may identify that the user voice input includes a non-voice input and identify not to register the user voice input as a wake-up voice input.

Referring back to FIG. 2, the processor 140 may verify whether a text similar to the text included in the user voice input wakes up the electronic apparatus 100 through the verification set evaluation module 145.

Figure 5:
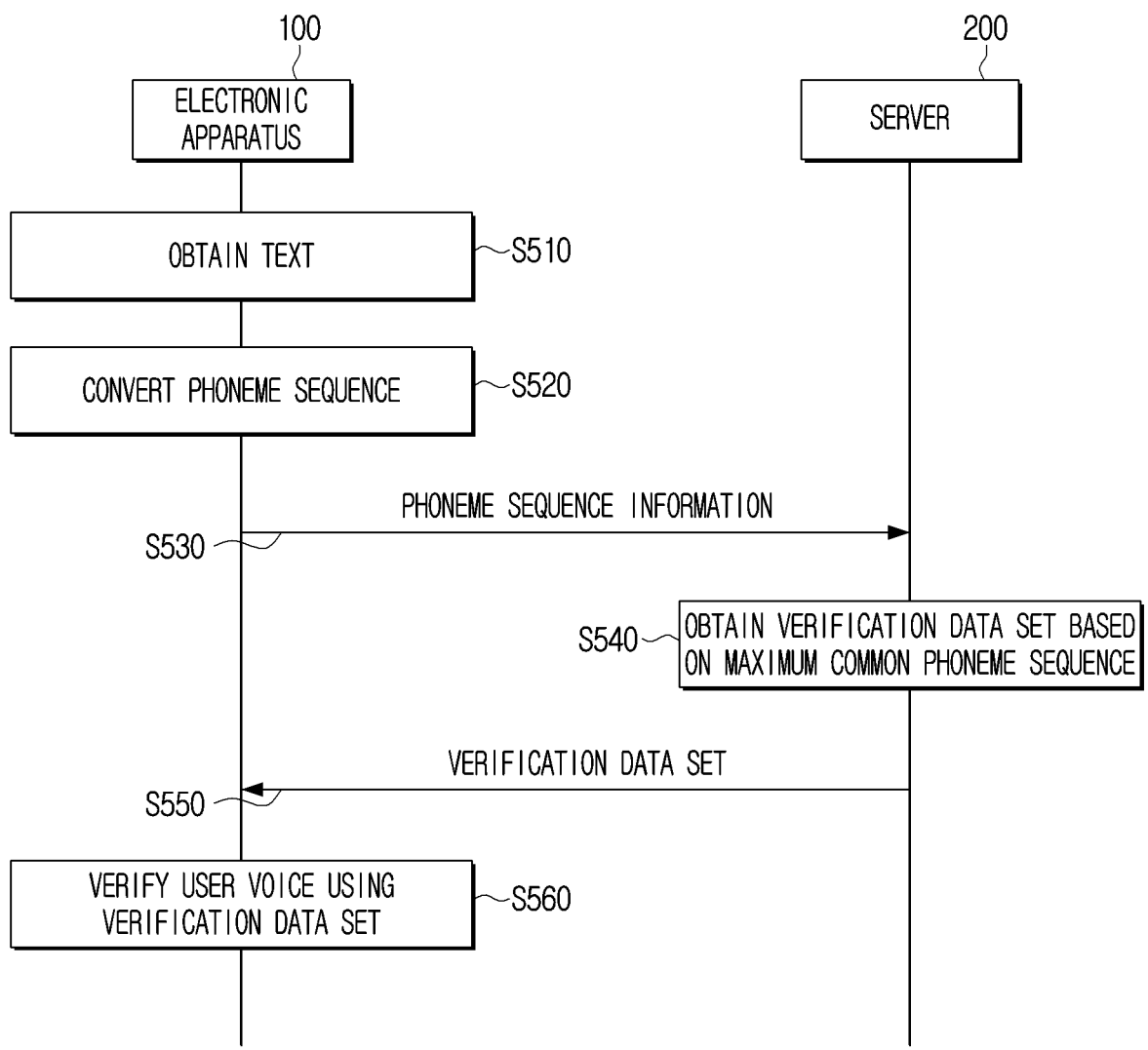
FIG. 5 is a sequence diagram illustrating a method of obtaining a verification data set according to an embodiment.

Specifically, the verification set evaluation module 145 may obtain a verification data set for verifying the user voice input based on the text included in the user voice input. This will be described with reference to FIG. 5.

The electronic apparatus 100 may obtain a text included in a user voice input (operation S510). In this case, the electronic apparatus 100 may obtain the text included in the user voice input by inputting the user voice input into the voice recognition model.

The electronic apparatus 100 may convert the obtained text into a phoneme sequence (operation S520). In this case, the phoneme is the smallest sound unit that distinguishes a meaning of a word, and the phoneme sequence means that the phonemes included in a word are sequentially arranged.

The electronic apparatus 100 may transmit phoneme sequence information as information related to text to the server 200 (operation S530). In this case, the electronic apparatus 100 may transmit information related to other texts in addition to phoneme sequence information.

The server 200 may obtain a verification data set based on a maximum common phoneme sequence (operation S540). Specifically, the server 200 may obtain a verification data set based on a phoneme sequence of a plurality of texts stored in the server 200 and a length of the phoneme sequence included in the phoneme sequence included in the phoneme sequence information. In other words, the server 200 may identify a text in which the length of the phoneme sequence included in common with the phoneme sequence included in the received phoneme sequence information is equal to or greater than a threshold value among a plurality of texts stored in the server 200. The server 200 may identify voice data corresponding to the identified text as a verification voice input, and obtain a verification data set including at least one identified verification voice.

The length of the phoneme sequence included in common with the phoneme sequence included in the received phoneme sequence information may refer to a number of phoneme sequences that are included in both the phoneme sequence of the text and the phoneme sequence included in the received phoneme sequence information.

For example, when the user voice is "Halli Galli", a phoneme sequence corresponding to the user voice may be (HH AA L R IY K AA L R IY). In addition, the server 200 may obtain voice data for Halli Geondam (HH AA LR IY K AX NN R AA M), which is text that the length of the phoneme sequence that is included in common with the phoneme sequence corresponding to the user voice is equal to or greater than a threshold value (e.g., five), voice data for Harleys (HH AA LR IY SS), or the like as verification voice.

The server 200 may transmit the obtained verification data set to the electronic apparatus 100 (operation S550).

The electronic apparatus 100 may verify the user voice input using the verification data set (operation S560). A method in which the verification set evaluation module 145 of the electronic apparatus 100 verifies the user voice input using the verification data set will be described with reference to FIG. 6.

In the embodiment described above, it has been described that the maximum common phoneme sequence is used to obtain a text similar to the text included in the user voice input, but this is only an embodiment, and text similar to the text included in the user voice input may be obtained by the other method.

Figure 6:
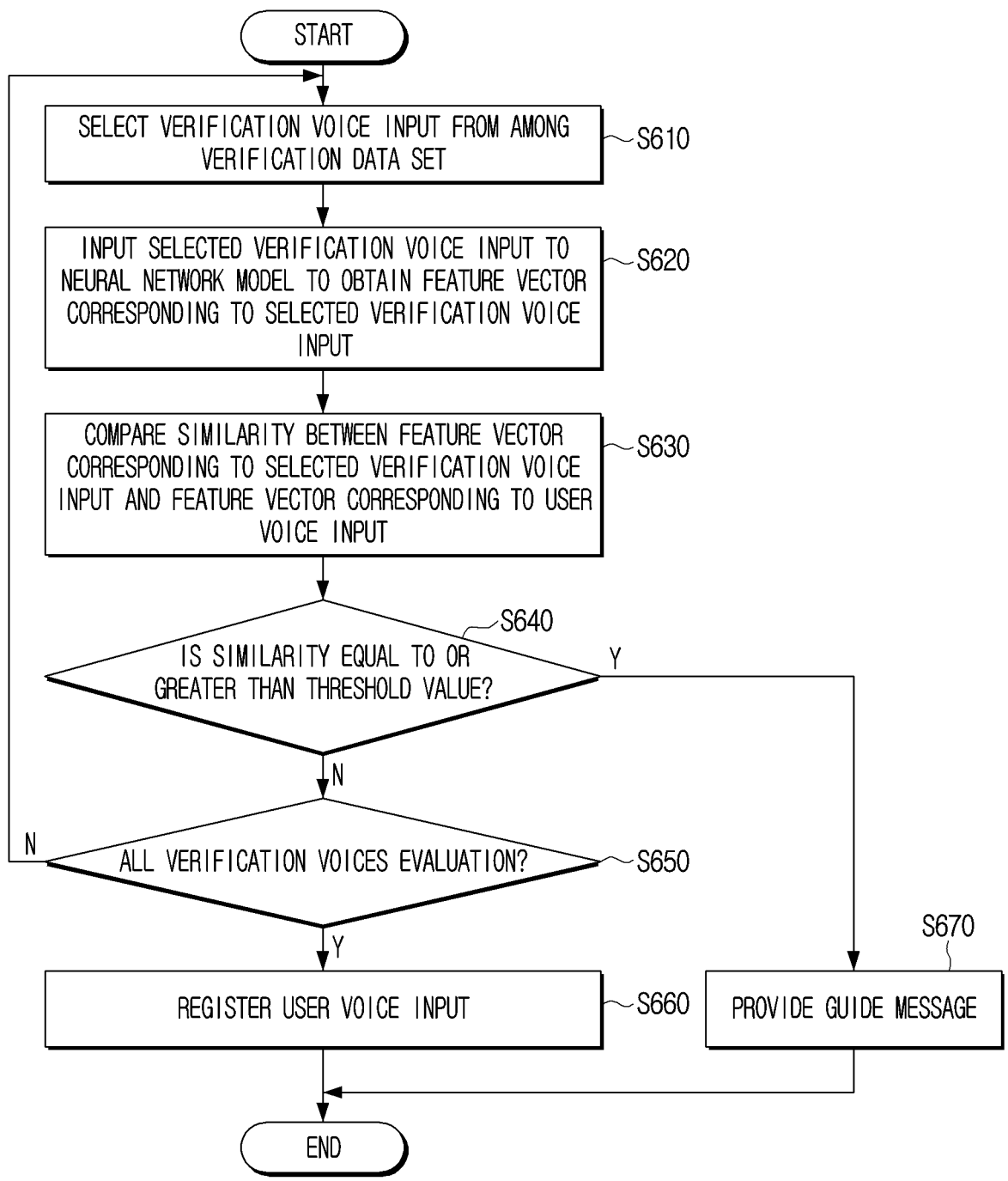
FIG. 6 is a flowchart illustrating a method of verifying a user voice input using a verification data set according to an embodiment.

FIG. 6 is a flowchart illustrating a method for the electronic apparatus 100 to verify a user voice input using a verification data set through the verification set evaluation module 145, according to an embodiment of the disclosure. The verification set evaluation module 145 may select a verification voice input from among the verification data sets received from the server 200 (operation S610). In this case, the verification set evaluation module 145 may select a verification voice input corresponding to the text having the highest similarity to the text of the user voice input (e.g., including the most common phoneme sequences) among the verification data sets.

At this time, the verification set evaluation module 145 may perform preprocessing on the verification voice input obtained through the preprocessing module 141, and extract voice features for the verification voice input preprocessed through the voice feature extraction module 142. However, when the verification voice input received from the server 200 is voice data that has undergone a pre-processing process and a voice extraction process, the pre-processing process and the voice extraction process may be omitted.

The verification set evaluation module 145 may obtain a feature vector corresponding to the selected verification voice input by inputting the selected verification voice input to the neural network model (operation S620). In this case, the neural network model may be one of a keyword recognition model trained to detect whether a user voice input includes a specific text or a voice recognition model trained to acquire a text included in the user voice input.

The verification set evaluation module 145 may compare a similarity between the feature vector corresponding to the selected verification voice input and the feature vector corresponding to the user voice input (operation S630). Specifically, the verification set evaluation module 145 may compare the similarity between the feature vector obtained in operation S620 and the feature vector obtained by inputting the user voice input uttered by the user into the neural network model. In this case, the verification set evaluation module 145 may calculate the similarity based on a cosine distance between the two feature vectors.

The verification set evaluation module 145 may identify whether the similarity is equal to or greater than a threshold value (operation S640). Specifically, when the similarity between the feature vector of the selected verification voice and the feature vector of the user voice is low, a probability of misrecognition of a keyword for performing a wake-up operation when the user voice input including the similar keyword is uttered is low, and thus the electronic apparatus 100 may highly evaluate the possibility of registering the user voice input, and when the similarity between the feature vector of the selected verification voice input and the feature vector of the user voice input is high, the probability of misrecognition of a keyword for performing a wake-up operation when the user voice input including the similar keyword is uttered is high, the verification set evaluation module 145 may evaluate the registration possibility of the user voice input as low.

When the similarity is less than the threshold value (operation S640-N), the verification set evaluation module 145 may identify whether evaluation has been performed on all verification voice inputs (operation S650).

When evaluation is not performed on all the verification voice inputs (operation S650-Y), the verification set evaluation module 145 may select a next verification voice input and repeatedly perform operations S610 through S640. When evaluation is performed on all verification voices input (operation S650-N), the verification set evaluation module 145 may register the corresponding user voice input as a wake-up voice input (operation S660).

However, when the similarity is equal to or greater than the threshold value (operation S640-Y), the verification set evaluation module 145 may provide a guide message. In this case, the guide message may include a message for guiding to additionally utter the user voice input including the same text. In other words, when a pronunciation of the user voice input is inaccurate or the user voice input is distorted by an external factor, the possibility of misrecognition by the similar keyword is high, and thus a guide message requesting the user's additional utterance may be provided.

In other words, by verifying the user voice input through internal verification using the verification data set as shown in FIG. 6, when the first uttered user voice input is clear, the user voice input is registered with only one utterance, and a minimum number of times when registering the wake-up voice may be uttered to register the user voice input as a wake-up voice input.

Referring back to FIG. 2, the processor 140 may register a user voice input as a wake-up voice input through the wake-up voice input registration module 146. In this case, the wake-up voice input registration module 146 may register the user voice input as a wake-up voice input based on verification results of the text evaluation module 143, the non-voice input evaluation module 144, and the verification set evaluation module 145. In other words, when a verification result of the text evaluation module 143, a verification result of the non-voice input evaluation module 144, and a verification result of the verification set evaluation module 145 are all verified as registering the user voice input as a wake-up voice input, the wake-up voice input registration module 146 may register the user voice input as a wake-up voice input and store a feature vector obtained by the first neural network model 30-1 (e.g., a keyword recognition model or a voice recognition model) and a feature vector obtained by the second neural network obtained by the model 30-2 (speaker input model) in the memory 130.

In this case, the wake-up voice input registration module 146 may sequentially obtain the verification results of the text evaluation module 143, the non-voice input evaluation module 144, and the verification set evaluation module 145, but this is only an embodiment, and the verification results of the text evaluation module 143, the non-voice input evaluation module 144, and the verification set evaluation module 145 may be acquired in parallel regardless of its order.

Figure 7A:
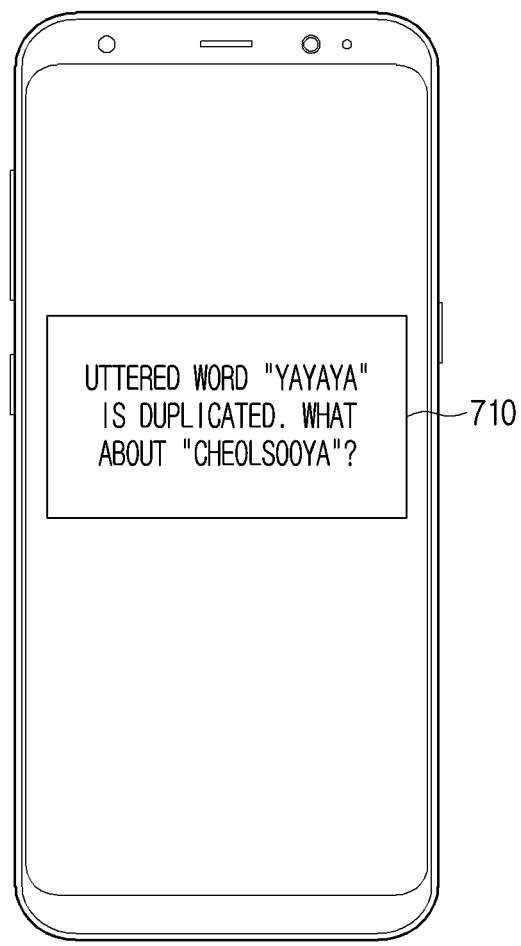
FIGS. 7A to 8 are views illustrating a guide message according to an embodiment.
Figure 7B:
Figure 7C:
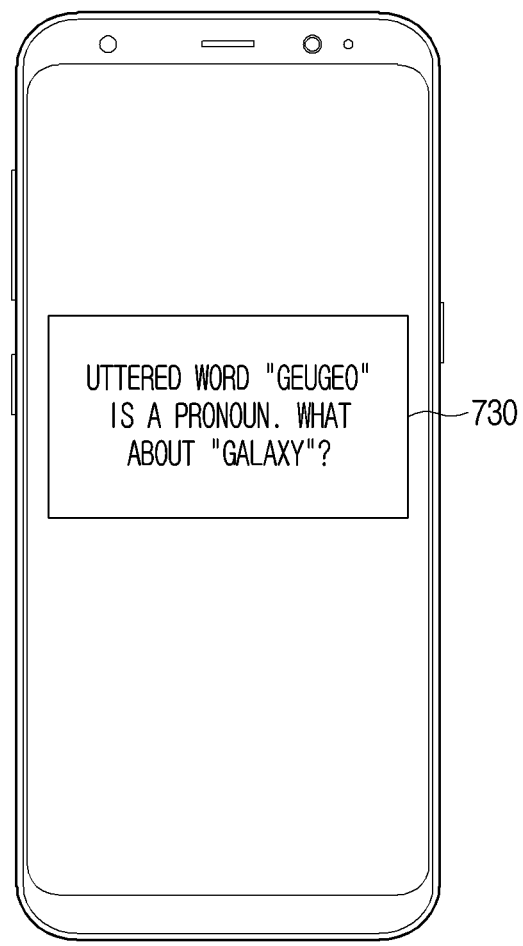

The message providing module 147 may provide a guide message based on the verification results of the text evaluation module 143, the non-voice input evaluation module 144, and the verification set evaluation module 145. In other words, if one of the verification results of the text evaluation module 143, the non-voice input evaluation module 144, and the verification set evaluation module 145 is determined to be inappropriate, the message providing module 147 may provide a guide message corresponding to a module identified to be in appropriate Specifically, if it is identified that the verification result of the text evaluation module 143 is inappropriate, the message providing module 147 may provide a guide message guiding a reason for the inappropriateness and an alternative text. In this case, the alternative text may be determined based on a use history DB. In other words, the alternative text may be determined as a text frequently used by the user, a text in a field of interest to the user, etc. based on the user history DB. For example, when the user wants to register "yayaya" as a wake-up voice input, the message providing module 147 may inform that the user voice input is duplicated and provide a guide message 710 guiding an alternative text as shown in FIG. 7A. In this case, "Cheolsooya" determined as the alternative text may be a text frequently used by the user while some phonemes are duplicated with "yayaya", which is the text included in the user voice input. As another example, when the user wants to register "cha" as a wake-up voice input, the message providing module 147 may provide a guide message 720 for guiding that the user voice input is short and guiding an alternative text, as shown in FIG. 7B. In this case, "Jadongcha" determined as the alternative text may be text related to a field of interest to the user while some phonemes are duplicated with "cha," which is a text included in the user voice input. As another example, when the user wants to register "Geugue" as a wake-up voice input, the message providing module 147 may inform that the user voice input includes a pronoun, as shown in FIG. 7C, and provide a guide message 730 guiding an alternative text. In this case, "Galaxy" determined as the alternative text may be a text frequently used by the user.

Figure 8:
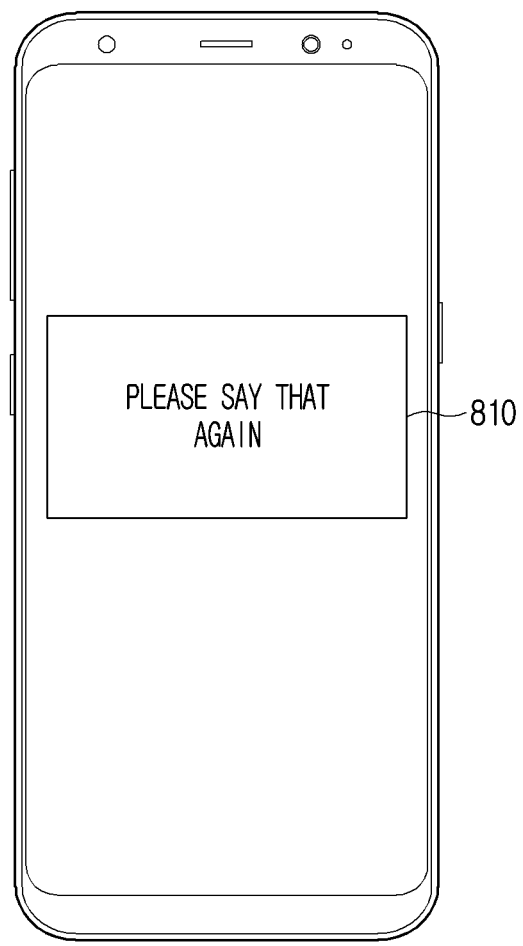

When it is identified that the verification result of one of the non-voice input evaluation module 144 and the verification set evaluation module 145 is inappropriate, the message providing module 147 may provide a guide message requesting an additional user voice input including the same text as the text included in the user voice input. For example, the message providing module 147 may provide a guide message 810 requesting an additional user voice input, as shown in FIG. 8. However, when the verification results of the non-voice input evaluation module 144 and the verification set evaluation module 145 are identified to be inappropriate more than a threshold number of times (e.g., 5 times), the message providing module 147 may provide a guide message requesting a user voice input including another text.

Figure 9:
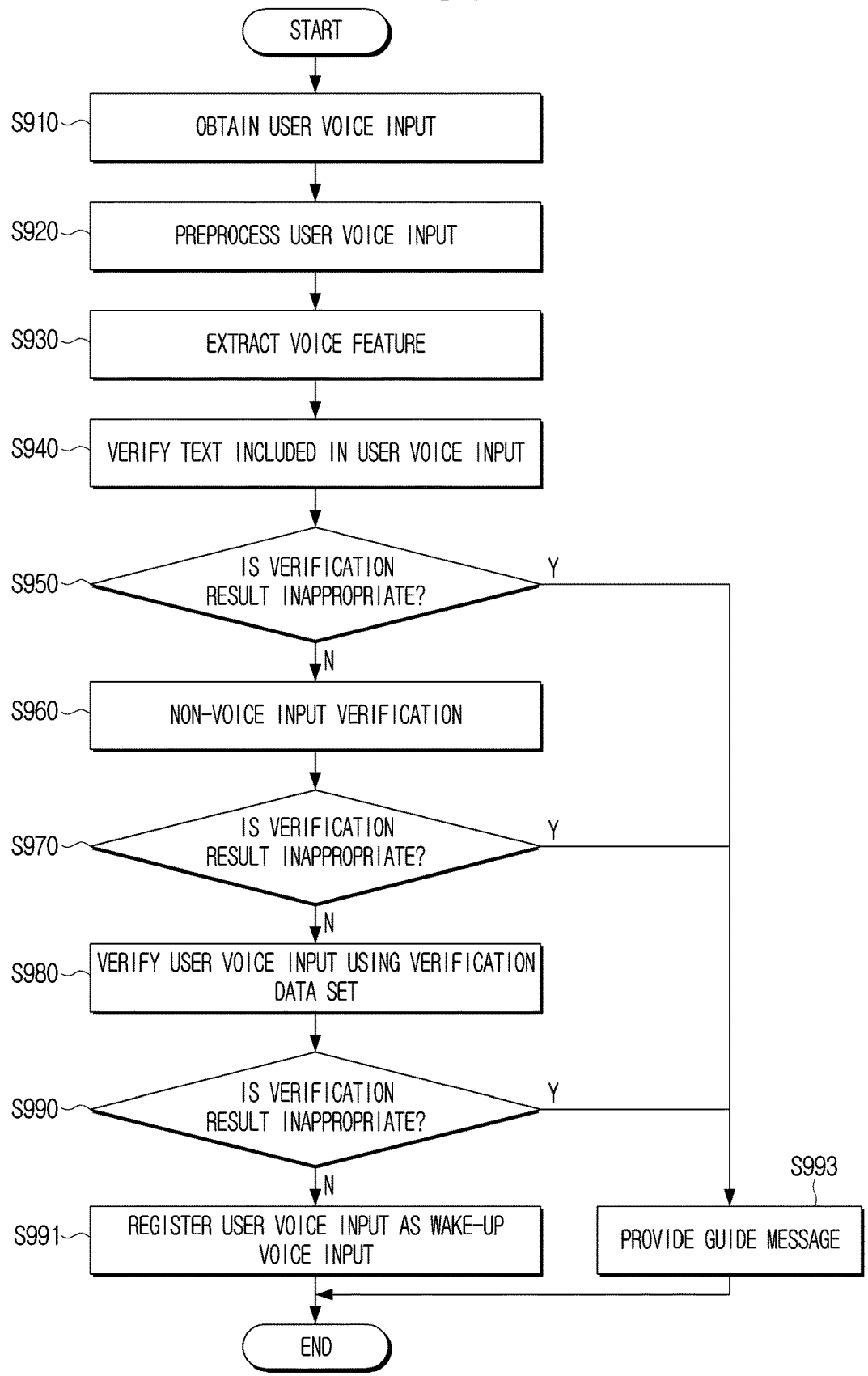
FIG. 9 is a flowchart illustrating a method of controlling an electronic apparatus according to an embodiment.

FIG. 9 is a flowchart illustrating a method of controlling an electronic apparatus according to an embodiment of the disclosure. FIG. 9 is a view illustrating an operation after the electronic apparatus 100 enters a mode for registering a wake-up voice input.

The electronic apparatus 100 may obtain a user voice input (operation S910). In this case, the user voice input may be received through the microphone 110, but this is only an embodiment, and may be received from an external source, and the user voice input may include text that the user wants to register as a wake-up voice input.

The electronic apparatus 100 may pre-process the acquired user voice input (operation S920). Specifically, the electronic apparatus 100 may perform pre-processing, such as noise removal, sound quality enhancement, on the user voice input.

The electronic apparatus 100 may extract a voice feature of the preprocessed user voice input (operation S930).

Specifically, the electronic apparatus 100 may extract voice features by converting time-dimensional voice data into user voice data of a frequency-dimensional user voice data.

The electronic apparatus 100 may verify the text included in the user voice input (operation S940). Specifically, as described with reference to FIGS. 2 and 3, the electronic apparatus 100 may verify whether the text included in the user voice input may be registered as the text of the wake-up voice input through the text evaluation module 143.

If it is identified that the text verification result is appropriate (operation S950-N), the electronic apparatus 100 may verify whether a non-voice input is included in the user voice input (operation S960). Specifically, as described with reference to FIGS. 2 and 4, the electronic apparatus 100 may verify whether a non-voice input is included in the user voice input through the non-voice input evaluation module 144.

If it is identified that the non-voice input verification result is appropriate (operation S970-N), the electronic apparatus 100 may verify the user voice input using the verification data set (operation S980). Specifically, as described with reference to FIGS. 2, 5 and 6, the electronic apparatus 100 may obtain a verification data set through the verification set evaluation module 145 and use the verification voice included in the verification data set to verity the user voice input.

If it is identified that the verification result using the verification data set is appropriate (operation S990-N), the electronic apparatus 100 may register the user voice input as a wake-up voice input (operation S991).

However, if it is identified that the text verification result is inappropriate (operation S950-Y), the electronic apparatus 100 may provide a guide message (operation S993). In this case, as shown in FIGS. 7A to 7C, the electronic apparatus 100 may provide a guide message including an inappropriate reason and an alternative text.

If it is identified that the non-voice input verification result is inappropriate (operation S970-Y) or is identified to be inappropriate as a result of the verification using the verification data set (operation S990-Y), the electronic apparatus 100 may provide a guide message (operation S993). In this case, as shown in FIG. 8, the electronic apparatus 100 may provide a guide message for guiding an additional utterance to the user voice input.

In FIG. 9, it has been described that text verification (operation S940), non-voice input verification (operation S960), and verification using the verification data set (operation S980) are sequentially performed, but this is only an embodiment, and text verification (operation S940), non-voice input verification (operation S960) and verification using the verification data set (operation S980) may be performed in parallel.

Figure 10:
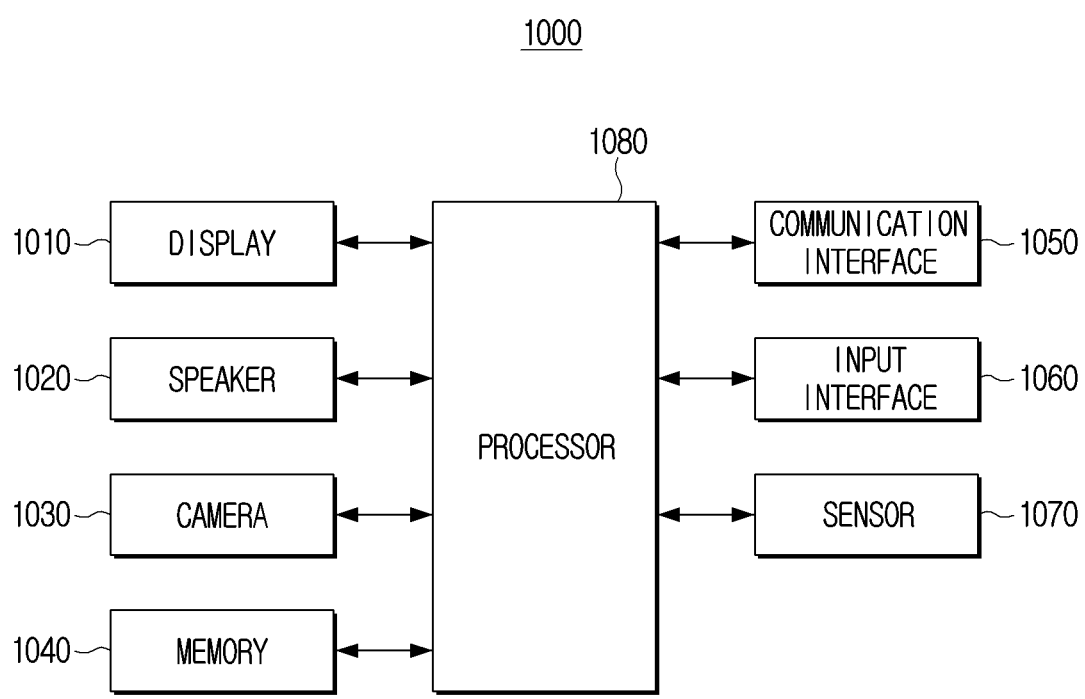
FIG. 10 is a detailed block diagram illustrating a configuration of an electronic apparatus according to an embodiment.

FIG. 10 is a detailed block diagram illustrating the configuration of an electronic apparatus according to an embodiment of the disclosure. As shown in FIG. 10, the electronic apparatus 1000 according to the disclosure may include a display 1010, a speaker 1020, a camera 1030, a memory 1040, a communication interface 1050, an input interface 1060, a sensor 1070 and a processor 1080. However, such a configuration is an example, and a new configuration may be added or some configuration may be omitted in addition to such a configuration in implementing the disclosure. The communication interface 1050, the memory 1040, and the processor 1080 may have the same configuration as the communication interface 120, the memory 130, and the processor 140 described with reference to FIG. 1, and thus redundant descriptions will be omitted.

The display 1010 may display an image acquired from an external source or an image captured by the camera 1030. In addition, the display 1010 may display a UI screen for registering a wake-up voice input, and may display a guidance message for guiding inappropriateness as a result of verification for a user voice input.

The display 1010 may be implemented as a liquid crystal display panel (LCD), organic light emitting diodes (OLED), etc., and the display 1010 may be implemented as a flexible display, a transparent display, etc., in some cases. However, the display 1010 according to the disclosure is not limited to a specific type.

The speaker 1020 may output a voice message. Particularly, the speaker 1020 may be included in the electronic apparatus 1000, but this is only an embodiment, and may be electrically connected to the electronic apparatus 1000 and located outside. In this case, the speaker 1020 may output a voice message guiding the user voice verification result.

The camera 1030 may capture an image. Particularly, the camera 1030 may capture an image including the user. In this case, the image may be a still image or a moving image. Also, the camera 1030 may include a plurality of lenses different from each other. Here, the plurality of lenses being different from each other may include a case in which a field of view (FOV) of each of the plurality of lenses is different from each other and a case in which positions at which each of the plurality of lenses are disposed are different, or the like.

The input interface 1060 may include a circuit, and the processor 1080 may receive a user command for controlling the operation of the electronic apparatus 1000 through the input interface 1060. Specifically, the input interface 1060 may include the display 1010 as a touch screen, but this is only an embodiment, and may include components such as buttons, a microphone 110 and a remote control signal receiver.

The sensor 1070 may acquire various information related to the electronic apparatus 1000. Particularly, the sensor 1070 may include a global positioning system (GPS) capable of acquiring location information of the electronic apparatus 1000, and a biometric sensor (e.g., a heart rate sensor, photoplethysmography (PPG) sensor, etc.) for acquiring biometric information of the user using the electronic apparatus 1000, and various sensors such as a motion sensor for detecting the motion of the electronic apparatus 1000.

The processor 1080 may be electronically connected to the display 1010, the speaker 1020, the camera 1030, the memory 1040, the communication interface 1050, the input interface 1060, the sensor 1070, which are components shown in FIG. 10 to control the overall function and operation of the electronic apparatus 1000.

Specifically, the processor 1080 may verify the user voice input to be registered as the wake-up voice input using the verification data set. Specifically, the processor 1080 may obtain a user voice input for registering a wake-up voice input through the microphone 110, input the user voice input to a learned neural network model (e.g., a keyword recognition model) to obtain a first feature vector corresponding to a text included in the user voice input, receive a verification data set determined based on information about the text included in the user voice input from the external server 200 through the communication interface 1050, obtain a second feature vector corresponding to the verification voice input by inputting the verification voice included in the verification data set received to the neural network model, and verify whether to register the user voice input as a wake-up voice based on the similarity between the first and second feature vectors.

Specifically, the processor 1080 may recognize the user voice input to obtain information about the text included in the user voice input, and transmit information about the text included in the user voice input to the external server 200 through the communication interface 1050. In this case, the external server 200 may obtain the verification voice input based on a phoneme sequence of a plurality of texts stored in the external server 200 and a length of the phoneme sequence included in common with the phoneme sequence included in the information on the text. The verification voice input may be voice data corresponding to a text whose length of the phoneme sequence included in the phoneme sequence included in the information on the text in common among the plurality of texts stored in the external server 200 is equal to or greater than a threshold value.

When the similarity between the first feature vector and the second feature vector is less than the threshold value, the processor 1080 may input another verification voice input included in the verification data set to the neural network model to obtain a third feature vector corresponding to the other verification voice input, and verify the user voice input by comparing similarities between the first feature vector and the third feature vector. However, when the similarity between the first feature vector and the second feature vector is equal to or greater than the threshold, the processor 1080 may provide a guide message requesting an additional user voice input for registering a wake-up voice input, as shown in FIG. 8.

The processor 1080 may register the user voice input as a wake-up voice input when the similarity between the first feature vector and the feature vectors corresponding to all the verification voices included in the verification data set is less than a threshold value.

Also, the processor 1080 may verify the text included in the user voice input. Specifically, the processor 1080 may input the user voice input to the voice recognition model to obtain text included in the user voice input, and verify whether to register the text of the wake-up voice input as the text of the wake-up voice input based on at least one of the length and duplication of phonemes of the text included in the user voice input. In other words, when the number of phonemes of the text included in the user voice input is less than a first threshold value or the number of phonemes of the text included in the user voice input is duplicated by more than a second threshold value, the processor 1080 may provide a guide message requesting utterance of an additional user voice input including other text for registering a wake-up voice input as shown in FIGS. 7A to 7C. In this case, the guide message may include a message for recommending a text determined based on usage history information of the electronic apparatus as the text of the wake-up voice input.

Also, the processor 1080 may verify whether a non-voice input is included in the user voice input. Specifically, the processor 1080 may input the user voice input into the learned voice determination model to obtain a feature value indicating whether the user voice input is a user voice input uttering a specific text, and verify whether to register the user voice input by the wake-up voice input based on the feature value. In this case, if the feature value is less than the threshold value, the processor 1080 may provide a guide message requesting an additional user voice input for registering a wake-up voice, as shown in FIG. 8.

According to the embodiment of the disclosure as described above, a convenience or usability of the wake-up voice input registration procedure may be increased by reducing the number of utterances of the user for registering the wake-up voice input to a minimum, and improve a performance of a technology capable of controlling an electronic apparatus through voice recognition by registering a high-quality wake-up voice input.

Functions related to artificial intelligence according to the disclosure are operated through the processor 1080 and the memory 1040. The processor 1080 may include one or a plurality of processors. In this case, one or more processors may include general-purpose processors such as a CPU, AP, digital signal processor (DSP), or the like, and graphics-only processors such as graphic processing unit (GPU) and vision processing unit (VPU). Alternatively, it may be a processor dedicated to artificial intelligence, such as a neural processing unit (NPU).

One or a plurality of processors 1080 may control to process input data according to a predefined operation rule or artificial intelligence model stored in the memory 1040. Alternatively, when one or more processors are AI-only processors, the AI-only processor may be designed with a hardware structure specialized for processing a specific AI model.

The functions related to the neural network model as described above may be performed through a memory and a processor. The processor may include one or more processors. In this case, one or more processors may be general-purpose processors such as CPUs and APs, GPUs, a graphics-only processor, such as a VPU, or an artificial intelligence-only processor, such as an NPU. One or more processors control to process input data according to a predefined operation rule or artificial intelligence model stored in the non-volatile memory and the volatile memory. The predefined action rule or artificial intelligence model is configured to be generated through learning.

Here, being generated through learning means that a predefined operation rule or artificial intelligence model of a desired feature is generated by applying a learning algorithm to a plurality of learning data. Such learning may be performed in a device itself on which artificial intelligence according to the disclosure is performed, or may be performed through a separate server/system.

The artificial intelligence model may be composed of a plurality of neural network layers. Each layer has a plurality of weight values, and a layer operation is performed through an operation of a previous layer and an operation of the plurality of weight values. Examples of neural networks include convolutional neural network (CNN), deep neural network (DNN), recurrent neural network (RNN), restricted Boltzmann machine (RBM), deep belief network (DBN), bidirectional recurrent deep neural network (BRDNN), generative adversarial networks (GAN), and deep Q-Networks, and the neural network in the disclosure is not limited to the above-described examples, except as otherwise specified.

The learning algorithm is a method of training a predetermined target device (e.g., a robot) using a plurality of learning data such that the predetermined target device can make a decision or predict by itself. Examples of the learning algorithm may include supervised learning, unsupervised learning, semi-supervised learning, or reinforcement learning, and the learning algorithm in the disclosure is not limited to the example described above.

The machine-readable storage media may be provided in a form of a non-transitory storage media. The "non-transitory storage media" means that the storage media does not include a signal (e.g., electromagnetic wave) and is tangible, but does not distinguish whether data is stored semi-permanently or temporarily in the storage media. For example, the term "non-transitory" may include a buffer that data is temporarily stored.

In addition, according to an embodiment, the methods according to various embodiments described above may be provided as a part of a computer program product. The computer program product may be traded between a seller and a buyer. The computer program product may be distributed in a form of the machine-readable storage media (e.g., compact disc read only memory (CD-ROM) or distributed online through an application store (e.g., PlayStore™). In a case of the online distribution, at least a portion of the computer program product (e.g., downloadable app) may be at least temporarily stored or provisionally generated on the storage media such as a manufacturer's server, the application store's server, or a memory in a relay server.

Further, each of the components (e.g., modules or programs) according to the various embodiments described above may be composed of a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by each respective component prior to integration. Operations performed by a module, a program, or other component, according to various embodiments, may be sequential, parallel, or both, executed iteratively or heuristically, or at least some operations may be performed in a different order, omitted, or other operations may be added.

Operations performed by a module, a program module, or other component, according to various exemplary embodiments, may be sequential, parallel, or both, executed iteratively or heuristically, or at least some operations may be performed in a different order, omitted, or other operations may be added.

The term "module" as used herein includes units made up of hardware, software, or firmware, and may be used interchangeably with terms such as logic, logic blocks, components, or circuits. A "module" may be an integrally constructed component or a minimum unit or part thereof that performs one or more functions. For example, the module may be configured as an application-specific integrated circuit (ASIC).

According to an embodiment, the various embodiments described above may be implemented as software including instructions stored in a machine-readable storage media which is readable by a machine (e.g., a computer). The device may include the electronic device according to the disclosed embodiments, as a device which calls the stored instructions from the storage media and which is operable according to the called instructions.

When the instructions are executed by a processor, the processor may directory perform functions corresponding to the instructions using other components or the functions may be performed under a control of the processor. The instructions may include code generated or executed by a compiler or an interpreter.

The foregoing exemplary embodiments and advantages are merely exemplary and are not to be construed as limiting the disclosure. The present teaching may be readily applied to other types of apparatuses. Also, the description of the exemplary embodiments of the disclosure is intended to be illustrative, and not to limit the scope of the claims, and many alternatives, modifications, and variations will be apparent to those skilled in the art.

What is claimed is:

1. An electronic apparatus comprising:
a microphone;
a communication interface;
a memory configured to store at least one instruction; and
a processor configured to execute the at least one instruction to:
obtain a user voice input for registering a wake-up voice input via the microphone;
input the user voice input into a trained neural network model to obtain a first feature vector corresponding to text included in the user voice input;
receive a verification data set determined based on information related to the text included in the user voice input from an external server via the communication interface;
input a verification voice input included in the verification data set into the trained neural network model to obtain a second feature vector corresponding to the verification voice input; and
identify whether to register the user voice input as the wake-up voice input based on a similarity between the first feature vector and the second feature vector.

2. The apparatus of claim 1, wherein the processor is further configured to:
recognize the user voice input to obtain the information related to the text included in the user voice input; and
transmit the information related to the text included in the user voice input to the external server via the communication interface,
wherein the external server is configured to obtain, using the information related to the text, the verification voice input based on a first phoneme sequence of a verification voice text that includes a number of common phonemes with a second phoneme sequence of the text included in the user voice input.

3. The apparatus of claim 2, wherein the verification voice input is voice data corresponding to the verification voice text having the number of common phonemes that is equal to or greater than a threshold value.

4. The apparatus of claim 2, wherein the processor is further configured to:
based on the similarity between the first feature vector and the second feature vector being less than the threshold value, input another verification voice input included in the verification data set into the trained neural network model to obtain a third feature vector corresponding to the another verification voice input;
compare another similarity between the first feature vector and the third feature vector; and
based on the other similarity between the first feature vector and the third feature vector being equal to or greater than the threshold value, provide a guide message requesting an additional user voice input for registering a wake-up voice input.

5. The apparatus of claim 4, wherein the processor is further configured to;
based on a plurality of similarities between feature vectors corresponding to all verification voice inputs included in the verification data set and the first feature vector being less than the threshold value, register the user voice input as the wake-up voice input.

6. The apparatus of claim 1, wherein the processor is further configured to:
- input the user voice input into a voice recognition model to obtain the text included in the user voice; and
- based on at least one of a length and a duplication of phonemes of the text included in the user voice input, identify whether to register the text included in the user voice input as the text of the wake-up voice input.

7. The apparatus of claim 6, wherein the processor is further configured to:
- based on a number of phonemes of the text included in the user voice input being less than a first threshold value or the number of phonemes of the text included in the user voice input being duplicated by greater than a second threshold value, provide a guide message requesting an utterance of an additional user voice input including another text for registering a wake-up word.

8. The apparatus of claim 7, wherein the guide message is configured to include a message for recommending the another text determined based on usage history information of the electronic apparatus as the text of the wake-up voice input.

9. The apparatus of claim 1, wherein the processor is further configured to:
- input the user voice input into a trained voice identification model to obtain a feature value indicating whether the user voice input is a user voice input uttering a specific text; and
- identify whether to register the user voice input as the wake-up voice input based on the feature value.

10. The apparatus of claim 9, wherein the processor is further configured to:
- based on the feature value being less than the threshold value, provide the guide message requesting the additional user voice input for registering the wake-up voice input.

11. A method of controlling an electronic apparatus, the method comprising:
- obtaining a user voice input for registering a wake-up voice input;
- inputting the user voice input into a trained neural network model to obtain a first feature vector corresponding to text included in the user voice input;
- receiving a verification data set determined based on information related to the text included in the user voice input from an external server;
- inputting a verification voice input included in the verification data set into the trained neural network model to obtain a second feature vector corresponding to the verification voice input; and
- identifying whether to register the user voice input as the wake-up voice input based on a similarity between the first feature vector and the second feature vector.

12. The method of claim 11, further comprising:
- recognizing the user voice input to obtain the information related to the text included in the user voice input; and
- transmitting the information related to the text included in the user voice input to the external server,
- wherein the server is configured to obtain the verification voice based on a first phoneme sequence of a verification voice text that includes a number of common phonemes with a second phoneme sequence of the text included in the user voice input.

13. The method of claim 12, wherein the verification voice input is voice data corresponding to the verification voice text having the number of common phonemes that is equal to or greater than a threshold value.

14. The method of claim 12, further comprising:
- based on the similarity between the first feature vector and the second feature vector being less than the threshold value, inputting another verification voice input included in the verification data set into the trained neural network model to obtain a third feature vector corresponding to the another verification voice input;
- comparing another similarity between the first feature vector and the third feature vector; and
- based on the other similarity between the first feature vector and the third feature vector being equal to or greater than the threshold value, providing a guide message requesting an additional user voice input for registering a wake-up voice input.

15. The method of claim 14, further comprising:
- based on a plurality of similarities between feature vectors corresponding to all verification voice inputs included in the verification data set and the first feature vector being less than the threshold value, registering the user voice input as the wake-up voice input.

* * * * *